(12) United States Patent
Beneke et al.

(10) Patent No.: US 6,597,760 B2
(45) Date of Patent: Jul. 22, 2003

(54) INSPECTION DEVICE

(75) Inventors: Knut Beneke, Ober-Olm (DE); Uwe Siedenburg, Essenheim (DE); Dirk Naumann, Lorsch (DE); Helmut Thoma, Mainz (DE)

(73) Assignee: Heimann Systems GmbH, Wiesbaden (DE)

( * ) Notice: Subject to any disclaimer, the term of this patent is extended or adjusted under 35 U.S.C. 154(b) by 0 days.

(21) Appl. No.: 10/152,612

(22) Filed: May 23, 2002

(65) Prior Publication Data

US 2002/0176533 A1 Nov. 28, 2002

Related U.S. Application Data

(60) Provisional application No. 60/305,906, filed on Jul. 18, 2001.

(30) Foreign Application Priority Data

May 23, 2001 (DE) .......................... 101 25 531

(51) Int. Cl.[7] ............................................ G01N 23/04
(52) U.S. Cl. ....................................................... 378/57
(58) Field of Search ............................................ 378/57

(56) References Cited

U.S. PATENT DOCUMENTS 6,088,423 A 7/2000 Krug et al.

FOREIGN PATENT DOCUMENTS

EP 0 485 872 5/1992

*Primary Examiner*—Craig E. Church
(74) *Attorney, Agent, or Firm*—Birch, Stewart, Kolasch & Birch, LLP

(57) ABSTRACT

In an inspection device for inspecting objects for explosives and other items prohibited for travel, particularly in carry-on baggage, a transport shaft (101) where there is little space, has incorporated thereabout radiation sources (10, 20, 30), which generate at least three beams ($FX_1$, $FX_2$, $FX_3$) at which are directed at corresponding linear detectors (11, 21, 31). This transport shaft (101) is extended by incorporation of equipment or system components (3, 4, 40) that are not part of the inspection system (100), or by additional system components (4, 40) being integrated into a housing (103) of the inspection device (100), with a necessary radiation protection for the inspection device in compliance with radiation protection regulations being provided by a shielding (102) placed on or around a piece of equipment or its system components (3) already existing in the transport system (1), ideally in front of the transport shaft (101).

20 Claims, 3 Drawing Sheets

INSPECTION DEVICE

This application claims priority under 35 U.S.C. §119(e) of U.S. Provisional Application No. 60/305,906, filed on Jul. 18, 2001, and German Application No. 101 25 531.4 filed on May 23, 2001, the entire contents of which are incorporated herein by reference.

BACKGROUND OF THE INVENTION

The present invention relates to an inspection device for inspecting objects, particularly for explosives in travelers' baggage.

In view of heightened security requirements at airports and other public facilities, it is necessary to upgrade, or retrofit, existing facilities, for example check-in counters in airports, with X-ray and inspection devices which can detect explosives and/or explosive substances, in particular. Oftentimes, only a small space is available for integration of such a retrofit device.

Known from EP 0 485 872 A2 is a device for the detection of nitrogenous, phosphoric, chloric and/or oxygenous substances. In this device, two X-ray sources are located at an edge of a transport shaft in close proximity to one another in a direction of travel. A third X-ray source is located across from the other two radiation sources so that its rays travel at a 90° angle with respect to the other two projections.

An arrangement of this type is disclosed in U.S. Pat. No. 6,088,423, which describes an inspection system with three X-ray sources whose beams or planes of radiation are directed nearly parallel to one another. The X-ray sources here are spaced apart from one another in the direction of travel and arranged about a transport shaft such that two X-ray sources are located on one side and the third X-ray source is beneath the shaft.

Neither of the aforementioned arrangements can be used for retrofitting an inspection device where there is a very small space.

Consequently, it is an object of the invention to provide an inspection device that works in a small space and is thus suitable for retrofitting.

SUMMARY OF THE INVENTION

According to principles of the invention, an inspection device for inspection of objects, in particular for detection of contraband items in luggage, comprises radiation sources with linear detectors directed at them, with the radiation sources and the linear detectors being arranged about a transport shaft. The radiation sources produce at least three beams that observe the object along at least three radiation planes. The inspection device is integrated into a housing of a separate system or the separate system is integrated into a housing of the inspection device, and in order to extend a radiation tunnel of the inspection device in front of the transport shaft a shield that works together with said transport shaft is affixed onto or around a system component that is part of the separate system.

The invention is based on the idea of using at least an available space as a transport shaft around which are arranged radiation sources that generate at least three beams aimed at corresponding linear detectors, and of providing a necessary radiation tunnel by incorporating existing system components of a different, separate, piece of equipment into the inspection device or vice versa. In this way, use is made of at least one system component, or a complete section, of the separate piece of equipment, which thus in a larger sense becomes a part of the inspection device without removal of the system component itself from the actual equipment and without limitation of its actual functional use.

To this end, in the case of a transport system in which an inspection device is to be retrofitted, a shielding hood is placed on or around a system component of a transport device for radiation shielding in front of a transport shaft. In the event that at least one system component of the transport system following this space is also incorporated, shielding in the form of a hood can also be placed on or around this system component. Frequently however, direct integration into a shield housing of the inspection system is also an option.

In transport systems of this nature, the space that can be used for radiation sources and linear detectors is, frequently, no larger than one maximum suitcase length.

Preferably, three radiation sources for producing the at least three beams are built in, with a linear detector being directed toward each of the radiation sources.

In one embodiment of the inspection device, radiation planes of the three beams of the radiation sources are arranged about the transport shaft in close proximity to one another in the transport direction. This transport shaft can be extended by incorporation of at least one following system component, which often likewise has a length of only one maximum suitcase length, resulting in an extension to two maximum suitcase lengths. In this case, a distance between the rearmost third radiation plane and the end of the following system component cannot be less than one maximum suitcase length, otherwise the object is not fully detected by the third radiation plane. This system component can be an adjustable-height lowering belt.

If the following section has a belt that is arranged lower within the transport system, in a further embodiment of the inspection device, the radiation planes of the radiation sources are arranged even closer to one another. In this case, the third radiation plane should not be closer to the end of the available space than one half of a maximum suitcase length. This arrangement prevents an object from tipping onto the subsequent, lower belt while it is still in the third radiation plane, which would produce false measurement results. Moreover, it is advantageous for the three radiation sources and the three linear detectors to be arranged inside a front half of the available space. Through a conveyor belt of equal height, tipping is prevented upon conveyance into the available space.

Further embodiments are also possible.

Accordingly, a maximum of two radiation sources can be attached to any one side of the transport shaft, with the third radiation source located on another side.

Preferably, none of the radiation sources are located beneath the transport system or the transport shaft.

In a further development of the invention, two linear detectors are accommodated in a shared mount, with the two linear detectors being separated from one another at least in a defined section.

In a further development of the invention, a closable curtain or roller shutter is integrated in the shielding, which in a preferred variant is attached at an entrance or beginning of the shielding. Furthermore, provision can be made to install a camera in order to monitor proper functioning of the system components that are covered by the shielding.

BRIEF DESCRIPTION OF THE DRAWINGS

The invention is described and explained in more detail below using two embodiments shown in the drawings from which further benefits can be seen. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
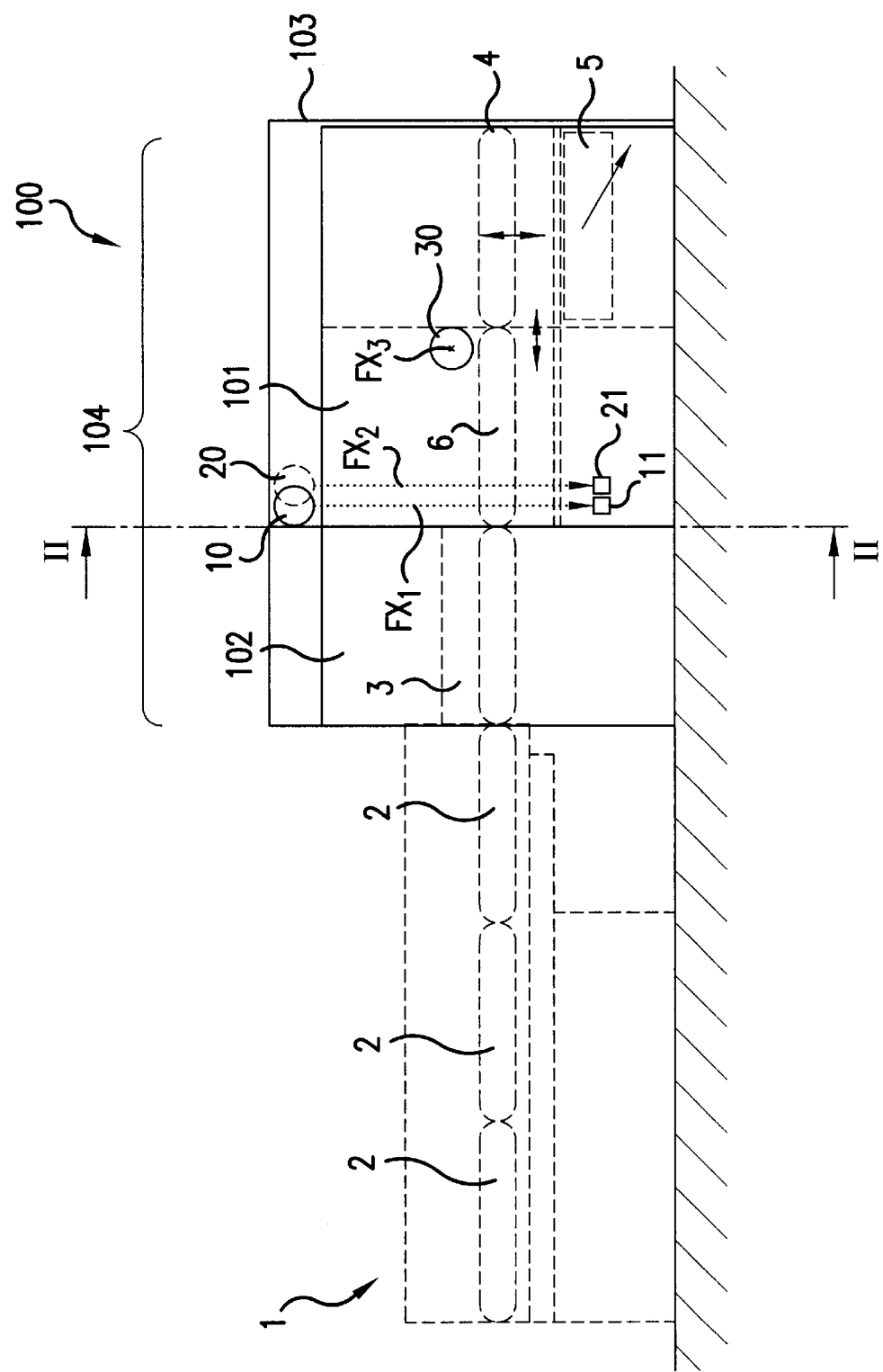
FIG. 1 is a schematic side view of a conventional transport system, into which an inspection device in accordance with a first embodiment of this invention is to be integrated.
Figure 3:
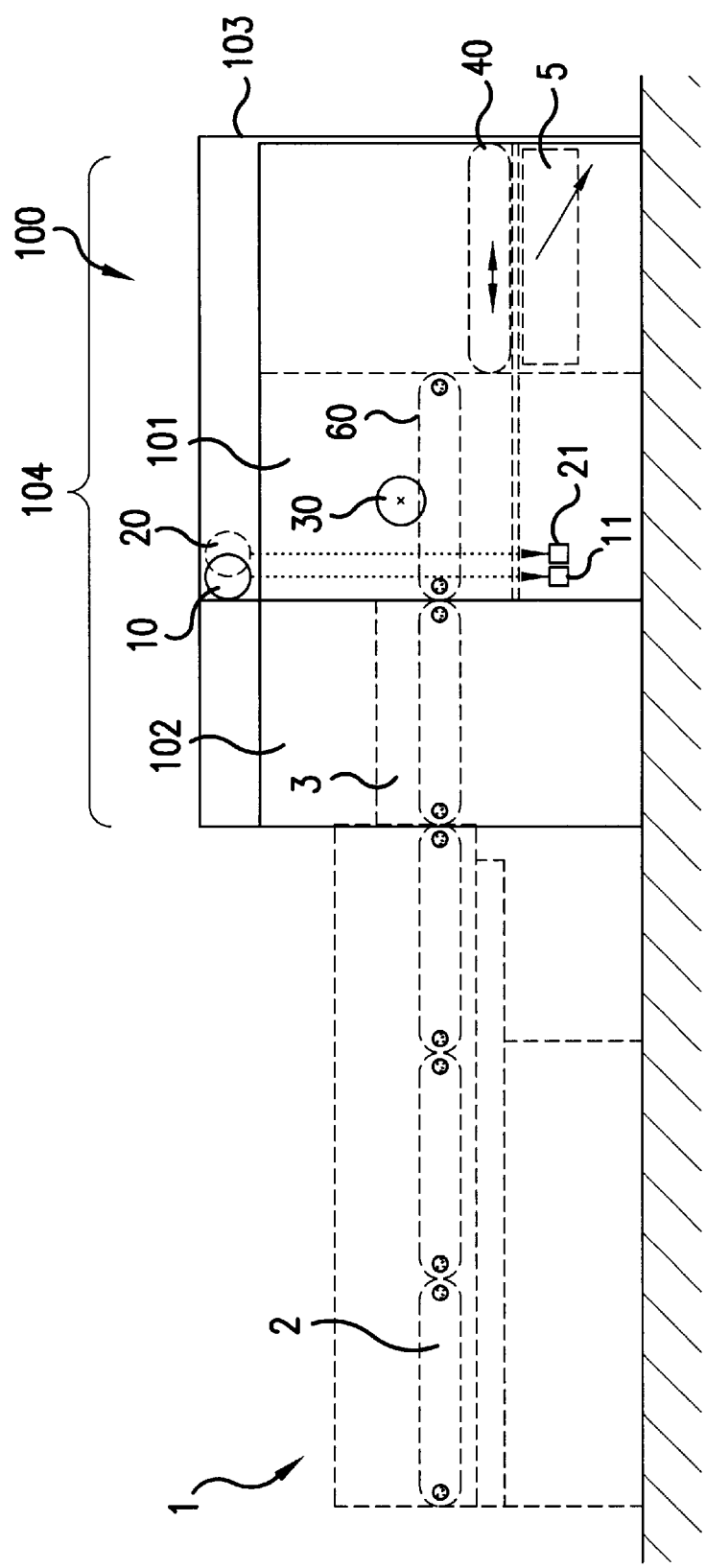
FIG. 3 is a schematic side view of the transport system of FIG. 1 showing a further embodiment of the present invention.

In FIG. 1, and also in FIG. 3, reference number 1 identifies a piece of equipment, here a transport system, that is functionally independent from an inspection device 100 and that is to be retrofitted with the inspection device 100. The transport system 1 has individual transport belts 2, which convey objects 90, for example a suitcase or other pieces of baggage, to a so-called flipper or tipping belt 3. The tipping belt 3 moves the objects 90 that are standing on the belts 2 into a horizontal position and centers them for further transport. This is followed by a belt 6 and a belt 4. At the end of the transport portion of the transport system 1, the object 90 is placed in a tray 5 from the belt 4. For this purpose, the belt 4 travels beneath belt 6, thus the belt 4 can be positioned lower than the belt 6. After this, the tray 5 with the object 90 is transferred from the transport system 1 to another transport system, which is not shown.

Inspection of the objects 90 for contraband items, especially for explosive substances in the objects 90, is intended in this example to take place after the tipping belt 3. However, a space in which the belt 6, 60, is located is very short for a retrofit of this nature since the length of the belt 6, 60 typically is no longer than one maximum suitcase length, or in practice approximately 100 cm.

In the first embodiment as shown in FIG. 1, provision is made to arrange radiation sources, three in this instance, 10, 20, 30, and linear detectors 11, 21, 31 (for clarity, only the visible ones are shown as small boxes), directed thereat, about the belt 6 following the tipping belt 3 in the direction of travel of the object 90 (in the direction of baggage travel). The length of this belt 6 defines a transport shaft 101, which is part of a radiation tunnel 104 of the inspection device 100. Due to incorporation of the system component 4 of the transport system 1 following the belt 6, here a lowerable belt 4, this radiation tunnel 104 or the transport shaft 101 can be extended. This tunnel or shaft is then two maximum suitcase lengths long, if the lowerable belt 4 likewise is only as long as one maximum suitcase, or bag, length. In this case, a space of the entire belt 6 is available for installation of the radiation sources 10, 20, 30 and the linear detectors 11, 21, 31.

By means of the beams $FX_1$, $FX_2$ and $FX_3$, the object 90 to be inspected is X-rayed from three beam directions, that is, in three radiation planes, and the signals produced by the associated linear detectors 11, 21, 31 are analyzed in a known manner. During this process, the object 90 is transported to the lowering belt 4, which is located at the same height as the belt 6, and transferred in a known manner to the other transport system that is not shown.

Figure 2:
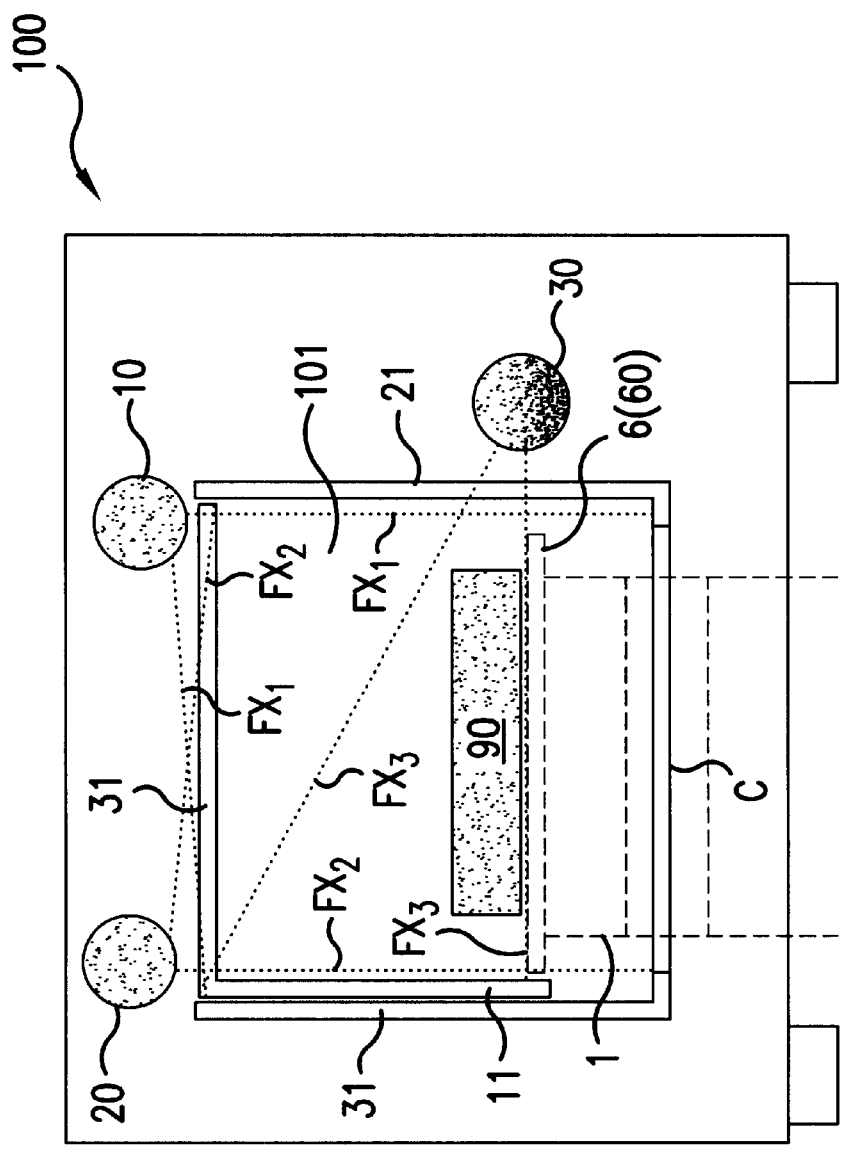
FIG. 2 is a cross-sectional view of a transport shaft of the inspection device along section II—II of FIG. 1.

In this embodiment, the radiation sources 10 and 20 are arranged on an upper side, preferably at upper corners, of the transport shaft 101, as shown in FIG. 2. Facing them, as already mentioned, and directed at the beams $FX_1$ and $FX_2$ from the radiation sources 10 and 20, are the linear detectors 11 and 21. A linear detector 31 is aimed at the beam $FX_3$ from the third radiation source 30.

If the system component 4 is a belt 40 arranged lower than the preceding space, here a belt 60, then provision is made in another embodiment as shown in FIG. 3 to arrange the three radiation sources 10, 20, 30 and the linear detectors 11, 21, 31 directed at them (for clarity, only the visible ones are shown as small boxes) within the front region of the belt 60 in the transport direction of the object 90 so that the radiation sources 10, 20, 30 and also the linear detectors 11, 21, 31 are very close together. A distance between the third (last) radiation plane of the beam $FX_3$ and the end of the belt 60 should not be shorter than one half a maximum suitcase length, so all radiation planes $FX_1$–$FX_3$ must be arranged within the front half of the belt 60. Here, too, by use of the closely spaced beams $FX_1$, $FX_2$ and $FX_3$, the object 90 to be inspected or examined is transilluminated from three beam directions, and the signals produced by the associated linear detectors 11, 21, 31 are analyzed in a known manner, in particular in order to detect the presence of explosive substances. Adjacent hereto is the system component 40, which receives the object 90. Transfer of the object out of the transport system 1 is then accomplished as described.

In order to satisfy radiation protection regulations and requirements, the inspection device 100 (in FIG. 1 and also FIG. 3) is equipped with a shield 102, which cooperates with the transport shaft 101 and is preferably placed as a shielding hood over at least one existing piece of equipment or system component in the transport system 1 and hence extends the radiation tunnel 104 forward in an ideal manner so that no radiation can escape in that direction. Hence, in the present transport system 1, the tipping belt 3 is a good candidate for the shielding 102 to be placed over.

In another advantageous variant, there is integrated in the shield 102 a closable curtain or roller shutter, which preferably is attached at the entrance of the shield 102, and thus also closes the entrance to the tipping belt 3 during an actual inspection procedure (which is not shown in the drawings).

When the system component 4, 40 located after the transport shaft 101 is incorporated, in a preferred embodiment this system component 4, 40 is integrated into a protective housing 103 of the inspection device 100 in order to ensure shielding from radiation, that is, X-rays or gamma rays.

Since one maximum suitcase length is approximately 100 cm in practice, the aforementioned solution discloses an inspection device 100 that can be installed in a small area with little effort and expense. The belt 4 and the system component 40 each have a maximum length in practice of only one maximum suitcase length.

Moreover, it is advantageous to install a camera (not shown in detail) within the shield 102 in order to be able to monitor and/or control proper functioning of the tipping belt 3.

It is also possible within the scope of the invention to accommodate two linear detectors 11, 21 in a shared linear mount, with the linear detectors 11, 21 being separated optically from one another, for example by a light shade, at least in an overlapping area "C." The linear detectors 11, 21 and 31 are comprised of a plurality of detector pairs that work in parallel, which preferably have at least one low-energy detector and a high-energy detector located behind it (not shown in the figures). This use of such detector pairs permits the detection of explosive substances in objects 90.

While the invention has been particularly shown and described with reference to a preferred embodiment, it will be understood by those skilled in the art that various changes in form and detail may be made herein without departing from the spirit and scope of the invention.

What is claimed is:

1. An inspection device for the inspection of objects, in particular for the detection of contraband items in luggage, said inspection device comprising:

radiation sources with linear detectors directed thereat, said radiation sources and said linear detectors being arranged about a transport shaft, with said radiation sources producing at least three beams that observe the object from at least three radiation planes, wherein said inspection device is integrated in a housing of a separate system or vice versa, and in order to extend a radiation tunnel of said inspection device in front of said transport shaft, a shield that cooperates with said transport shaft is mounted about a system component that is part of said separate system.

2. The inspection device according to claim 1, wherein said separate system is a transport system of a check-in counter.

3. The inspection device according to claim 1, wherein a length of said shield is not shorter than one maximum suitcase length.

4. The inspection device according to claim 1, wherein a system component of said separate system is equipped with shielding behind said transport shaft.

5. The inspection device according to claim 1, wherein a maximum distance between a first radiation source and a last radiation source is determined by a length of an available belt, which is one maximum suitcase length.

6. The inspection according to claim 5, wherein a maximum distance between a last radiation plane and an end of said available belt must be no shorter than one half of said maximum suitcase length.

7. The inspection device according to claim 5, wherein a maximum distance between a last radiation plane and the end of a following system component must be no shorter than one half of said maximum suitcase length.

8. The inspection device according to claim 3, wherein the maximum suitcase length is approximately 100 cm.

9. The inspection device according to claim 1, wherein there are three said radiation sources and three said linear detectors attached about said transport shaft.

10. The inspection device according to claim 1, wherein at least two of said radiation sources are attached about a transport shaft in close proximity to one another in the transport direction of said object.

11. The inspection device according to claim 1, wherein a maximum of two of said radiation sources are attached to any one side of said transport shaft.

12. The inspection device according to claim 11, wherein a remaining radiation source is located on a side of said transport shaft different from said two radiation sources.

13. The inspection device according to claim 1, wherein none of said radiation sources are located beneath said transport system and said transport shaft.

14. The inspection device according to claim 1, wherein two of said linear detectors are accommodated in a shared mount.

15. The inspection device according to claim 1, wherein one of a closable curtain and a roller shutter is integrated into said shield.

16. The inspection device according to claim 15, wherein said one of said curtain and said roller shutter is attached at an entrance of said shield.

17. The inspection device according to claim 1, wherein a camera is provided inside said shield.

18. The inspection device according to claim 5, wherein the maximum suitcase length is approximately 100 cm.

19. The inspection device according to claim 6, wherein the maximum suitcase length is approximately 100 cm.

20. The inspection device according to claim 7, wherein the maximum suitcase length is approximately 100 cm.

* * * * *